United States Patent [19]

Harrison

[11] Patent Number: 5,029,179
[45] Date of Patent: Jul. 2, 1991

[54] LASER APPARATUS AND METHOD FOR SIMPLE CONVERSION BETWEEN STANDING-WAVE AND RING RESONATOR CONFIGURATIONS

[75] Inventor: James Harrison, Cambridge, Mass.

[73] Assignee: Schwartz Electro-Optic, Inc., Orlando, Fla.

[21] Appl. No.: 507,710

[22] Filed: Apr. 10, 1990

[51] Int. Cl.$^5$ ............................................. H01S 3/081
[52] U.S. Cl. ........................................ 372/94; 372/92
[58] Field of Search .................... 372/94, 95, 92, 106

[56] References Cited

U.S. PATENT DOCUMENTS

| 3,969,687 | 7/1976 | Freiberg et al. | 372/95 |
| 3,969,688 | 7/1976 | Freiberg et al. | 372/95 |
| 4,135,787 | 1/1979 | McLafferty | 372/95 |

OTHER PUBLICATIONS

Tang, C. L. et al., "Spectral Output and Spiking Behavior of Solid-State Lasers", *Journal of Applied Physics* vol. 34, No. 8, pp. 2289-2295, Aug. 1963.
Tang, C. L., "On Maser Rate Equations and Transient Oscillations" *Journal of Applied Physics*, vol. 34, No. 10, Oct. 1963, pp. 2935-2940.

*Primary Examiner*—James W. Davie
*Attorney, Agent, or Firm*—Duckworth, Dyer, Allen & Doppelt

[57] ABSTRACT

A laser apparatus and method is provided for easily converting between standing-wave and ring-cavity configurations, by providing an optical coupler and an end mirror which are movable between retro-reflective and fold-reflective conditions.

14 Claims, 1 Drawing Sheet

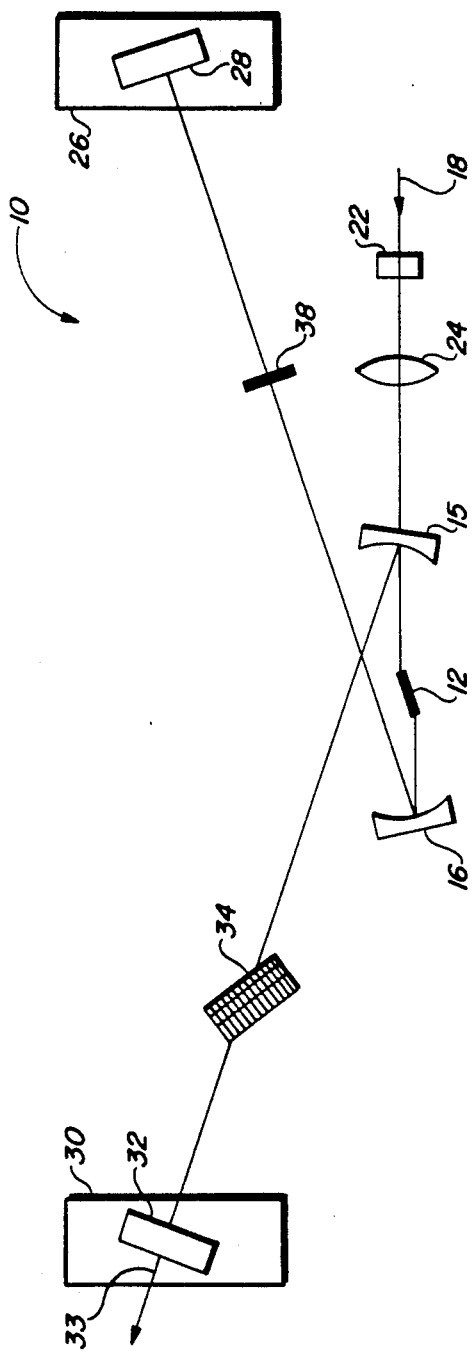
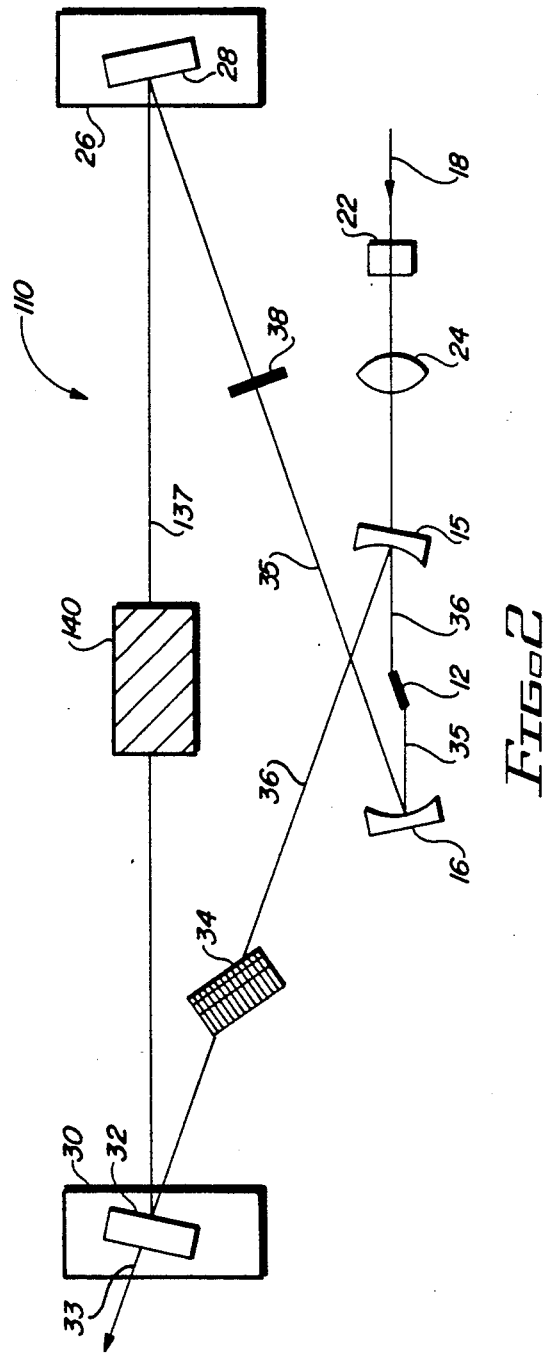

LASER APPARATUS AND METHOD FOR SIMPLE CONVERSION BETWEEN STANDING-WAVE AND RING RESONATOR CONFIGURATIONS

BACKGROUND OF THE INVENTION

The present invention relates to laser apparatus and methods.

Standing-wave laser resonators and ring cavity resonators are both well known in the prior art. See, for example, the following U.S. Pat. Nos. 3,969,687 and 3,969,688 to Freiberg et al; and 4,135,787 to McLafferty. With respect to unidirectional ring cavity laser resonators, see Tang, Statz, and deMars, Jr., "Spectral output and spiking behavior of solid-state lasers," *Journal of Applied Physics*, Vol. 34, pp.2289-2295 (1963).

SUMMARY OF THE INvENTION

The present invention is directed to a technique and associated apparatus and method for simply and easily converting a standing-wave laser resonator to a ring cavity laser resonator by using common laser and optical components and by the simple expedient of rotating the two end reflectors along a stable platform between retro-reflective and fold-reflective conditions, and by further utilizing means, such as an optical diode, to achieve directionality, when desired, when using the ring-cavity configuration.

Apparatus in accordance with the present invention utilizes a partially reflective output coupler and reflective means, together with a lasing medium defining two paths of laser energy, including a first path between the reflective means and the laser medium, and a second laser energy path between the laser medium and the output coupler. Means are provided for selectively defining a third path of laser energy between the output coupler and the reflective means, so that the laser apparatus may be easily and simply converted between a standing-wave laser without the third path and a ring-cavity laser utilizing the third laser energy path between the output coupler and the reflective means. In a preferred embodiment, the reflective means comprises a fully reflective flat mirror, and opposing first and second end mirrors associated with the laser medium, the first end mirror defining one end of the first laser energy path and the second end mirror defining one end of the second laser energy path. Suitably, the laser medium is pumped with a source of laser energy having a spectral range different from the spectral range and output of the laser medium. In one example, the laser medium comprises a titanium-doped sapphire laser crystal, and the pumping source comprises either a blue-green argon-ion laser, or a frequency-doubled neodymium (Nd) laser source. It is also preferred that one of the end mirrors is at least partially transmissive to the spectral range of the pumping source, so that the pumping energy may be injected into the laser medium through that partially transmissive end mirror.

The method of the present invention thus permits a single set of laser components to be used for selectively defining a third path of laser energy between the output coupler and the reflective means, for easy conversion between a standing-wave resonator configuration and a ring-cavity configuration. It will of course be understood that the optical diode described above may be permanently installed, but only used in the ring-cavity configuration.

THE DRAWING

FIG. 1 is a schematic illustration of a standing-wave laser configuration in accordance with the present invention.

FIG. 2 is a schematic illustration of a unidirectional ring-cavity laser resonator configuration in accordance with the present invention.

DETAILED DESCRIPTION

The present invention will now be described with reference to FIGS. 1 and 2. In FIG. 1, reference numeral 10 refers generally to the laser and optical components which are laid out in a standing-wave laser resonator configuration, while in FIG. 2 reference numeral 110 refers generally to a unidirectional ring-cavity laser resonator configuration. In FIGS. 1 and 2, like reference numerals are used for the laser and optical components which are common to both the standing-wave and ring-cavity resonator configurations, while in FIG. 2, reference numerals of the "100" category are unique to the ring-cavity laser resonator configuration shown in FIG. 2.

Noting FIG. 1, the standing-wave laser resonator 10 includes a crystal 12 which may, for example, comprise a titanium-doped sapphire. First and second end mirrors 15, 16 are positioned at opposite ends of the crystal 12. One of the end mirrors 15 is partially transmissive to an input from a pumping source 18, which suitably comprises an argon-ion or frequency doubled neodymium (Nd) pumping source, whose radiation falls within a range on the order of about 450-550 nanometers. In accordance with the present invention, the output from the pumping source 18 passes through a half-way plate 22 and a focusing lens 24.

Conventionally, laser energy from the sapphire crystal 12 passes out of the crystal at Brewster's angle along first and second laser energy paths 35, 36. The first laser energy path 35 is reflected between the second end mirror 16 and a reflective mirror 28, the mirror 28 being movably mounted upon a fixed base 26. The second laser energy path 36 is reflected between the first end mirror 15 and an output coupler 32, the coupler 32 being movably positioned upon a fixed base 30. The output coupler 32 is partially transmissive to the spectral range of the crystal 12, so as to pass a portion of the laser energy along the second path 36 as an output 33.

A birefringent filter element 34 may be inserted along the second laser energy path 36.

In accordance with the present invention, the standing-wave laser resonator 10 of FIG. 1 may be easily and simply converted to a ring-cavity laser resonator by moving the mirror 28 in the output coupler 32 from the retro-reflective condition shown in FIG. 1 into a fold-reflective condition as shown in FIG. 2. Stable means for moving the output coupler 32 and the reflective mirror 28 are known in the art, and are not described here; it is of course preferred that both remain fixed to their respective bases 26, 30.

When desired, the ring-cavity laser resonator 110 of FIG. 2 may be made unidirectional by placing an optical diode 140 in any laser energy path; for ease of conversion, it is preferred that the optical diode 140 be placed along the third laser energy path between the output coupler 32 and the reflective mirror 28. Suitably, an etalon 38 may also be installed in any laser energy path. It will of course be understood that the optical diode 140 may be permanently installed between the output coupler 32 and the reflective mirror 28, and may simply be used to establish the desired directionality of the ring-cavity laser resonator 110 upon the movement of the output coupler 32 and the reflective mirror 28 into the fold-reflective condition, as described above.

Inclusion of the half-wave plate 22 allows continuous variation of the plane of polarization of the linearly polarized pump radiation. The half-wave plate 22 also allows the user to align the polarization of the pump with that of the resonator, which is defined by intracavity elements, including the gain element, which are inserted at Brewster's angle, or with Brewster-angled surfaces, in the resonator. The sapphire laser is polarized in the plane of the resonator.

It will thus be appreciated by those skilled in the art that the utilization of the technique, apparatus and method described above permits the easy and simple conversion of a standing-wave laser resonator into a ring-cavity laser resonator, while maintaining a high degree of stability for the laser and optical components of each respective laser. Other modifications to the technique, apparatus and method described above may be employed without departing from the spirit and scope of the invention.

What is claimed is:

1. Laser apparatus, comprising:
   a partially reflective output coupler;
   reflective means;
   a laser medium defining two paths of laser energy, including a first path between the reflective means and the laser medium and a second path between the laser medium and the output coupler; and
   means for selectively defining a third path of laser energy between the output coupler and the reflective means, so that the laser apparatus may be easily converted between a standing-wave laser configuration without the third laser energy path, and a ring-cavity laser resonator configuration utilizing the third laser energy path.

2. The laser apparatus recited in claim 1 wherein the third laser energy path defining means comprises mean for selectively moving the output coupler and reflective means between retro-reflective and fold-reflective conditions.

3. The laser apparatus recited in claim 2 further comprising a optical diode for restricting the directionality of laser energy in the laser energy paths while in ring-cavity configuration.

4. The laser apparatus recited in claim 3 wherein the optical diode is inserted between the output coupler and the reflective means along the third laser energy path.

5. The laser apparatus recited in claim 4 wherein the reflective means comprises a flat mirror movable between retro-reflective and fold-reflective conditions.

6. The laser apparatus recited in claim 1 further comprising opposing first and second end mirrors, the first end mirror in the first laser energy path and the second end mirror in the second laser energy path.

7. The laser apparatus recited in claim 6 further comprising a source of pumping energy having a spectral range different from the spectral output of the laser medium.

8. The laser apparatus recited in claim 7 wherein one of the end mirrors is transmissive to the spectral range of the pumping source, and further comprising means for injecting the pumping energy into the laser medium through the one end mirror.

9. The laser apparatus recited in claim 8 wherein the pumping source is a source of laser energy.

10. The laser apparatus recited in claim 9 wherein the laser medium is titanium-doped sapphire and the spectrum of the pumping source radiation falls within a range on the order of about 450–550 nanometers.

11. The laser apparatus recited in claim 9 further comprising a half-wave plate between the laser source of pumping energy and the laser medium for permitting variation of the plane of polarization of a linearly polarized laser pumping source.

12. Laser apparatus, comprising:
    a laser energy source having opposing first and second end mirrors, one of which is partially transmissive to an incident source of pumping energy;
    a reflective mirror spaced from the laser medium and defining a first laser energy path between the reflective mirror and one of the end mirrors;
    an output coupler spaced from the laser medium and defining a second laser energy path between the output coupler and the other of the end mirrors, the output coupler being partially transmissive to the spectral range of the laser medium, so as to pass as an output a portion of the laser energy in the second laser energy path;
    means for imparting directionality to the laser energy in the first and second laser energy paths; and
    means for selectively moving the reflective mirror and the output coupler between retro-reflective and fold-reflective conditions, so as to selectively define a standing wave laser resonator when the reflective mirror and the output coupler are in the retro-reflective condition, and to selectively define a unidirectional ring laser resonator when the reflective mirror and the output coupler are in the fold-reflective condition 13. The apparatus recited in claim 12 wherein at least one of the end mirrors is transmissive to the spectral range of the pumping source, and further comprising means for injecting energy from the pumping source into the laser medium through at least that one end mirror.

14. A method for easily converting a standing-wave laser resonator into a ring-cavity laser resonator, comprising the steps of:
    providing a partially reflective output coupler, a reflective mirror and a laser medium defining two laser energy paths, one between the laser medium and the reflective mirror and the second between the laser medium and the output coupler; and
    selectively moving the output coupler and the reflective mirror between retro-reflective and fold-reflective conditions, so that a standing-wave laser resonator is defined by the output coupler, the reflective mirror and the laser medium when the output coupler and the reflective mirror are in the retro-reflective condition, and so that a ring-cavity laser resonator is defined when the output coupler and the reflective mirror are in the fold-reflective condition.

* * * * *